(12) United States Patent
Sabo (10) Patent No.: US 11,571,853 B2
(45) Date of Patent: Feb. 7, 2023

(54) PRECISION OPTICAL ASSEMBLY FOR THREE DIMENSIONAL PRINTING

(71) Applicant: 3D Systems, Inc., Rock Hill, SC (US)

(72) Inventor: David Sabo, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 326 days.

(21) Appl. No.: 16/701,613

(22) Filed: Dec. 3, 2019

(65) Prior Publication Data

US 2020/0198236 A1 Jun. 25, 2020

Related U.S. Application Data

(60) Provisional application No. 62/781,971, filed on Dec. 19, 2018.

(51) Int. Cl.
| | | |
|---|---|---|
| *B29C 64/245* | (2017.01) | |
| *B33Y 30/00* | (2015.01) | |
| *B33Y 50/02* | (2015.01) | |
| *B29C 64/393* | (2017.01) | |
| *B29C 33/38* | (2006.01) | |
| *B29C 64/227* | (2017.01) | |
| *B33Y 99/00* | (2015.01) | |

(52) U.S. Cl.
CPC ........ *B29C 64/245* (2017.08); *B29C 33/3842* (2013.01); *B29C 64/227* (2017.08); *B29C 64/393* (2017.08); *B33Y 30/00* (2014.12); *B33Y 50/02* (2014.12); *B33Y 99/00* (2014.12)

(58) Field of Classification Search
CPC ..... B29C 64/259; B29C 64/20; B29C 64/124; B29C 64/135; B29C 64/106; B29C 64/227; B29C 64/245; B29C 64/25; B29C 64/264; B29C 64/386; B33Y 30/00
USPC ........................................... 425/182
See application file for complete search history.

(56) References Cited

U.S. PATENT DOCUMENTS 5,545,367 A * 8/1996 Bae ................... B33Y 30/00
427/595
6,367,791 B1 * 4/2002 Calderon ................ B29C 48/05
269/291

(Continued)

FOREIGN PATENT DOCUMENTS

DE 102012011610 11/2012
DE 102017210384 B3 * 8/2018 ........... B29C 64/124

(Continued)

*Primary Examiner* — Joseph S Del Sole
*Assistant Examiner* — Margaret B Hayes (57) ABSTRACT

A three-dimensional printer includes a light engine, a support plate, and a resin vessel. The light engine is configured to selectively harden photocurable resin at a build plane in the resin vessel. The support plate is formed from cast metal and is in a fixed vertical relation to the light engine. The support plate includes an upper side with an upstanding ridge. The upstanding ridge has an upper datum surface that has been machined to a controlled height. The support plate also includes a separately formed ring disposed upon the upper datum surface. The separately formed ring defines a crest of the upstanding ridge. The resin vessel includes a transparent sheet that defines a lower bound for resin contained in the resin vessel. The transparent sheet impinges upon the crest to define a vertical location of the build plane in relation to the light engine.

20 Claims, 7 Drawing Sheets

(56) References Cited

U.S. PATENT DOCUMENTS

| | | | | |
|---|---|---|---|---|
| 9,486,964 B2* | 11/2016 | Joyce | .................... | B29C 64/135 |
| 10,807,309 B2* | 10/2020 | Munro | .................... | B29C 64/20 |
| 10,821,668 B2* | 11/2020 | Thompson | ............. | B33Y 40/00 |
| 2006/0279079 A1* | 12/2006 | Weber | .................... | F16L 19/02 |
| | | | | 285/33 |
| 2011/0089610 A1* | 4/2011 | El-Siblani | ............. | B29C 64/135 |
| | | | | 425/89 |
| 2013/0078325 A1* | 3/2013 | Sperry | .................. | G03F 7/0037 |
| | | | | 425/169 |
| 2016/0046075 A1 | 2/2016 | DeSimone et al. | | |
| 2016/0176112 A1* | 6/2016 | Liu | ......................... | B29C 53/04 |
| | | | | 428/130 |
| 2016/0325493 A1* | 11/2016 | DeSimone | ............... | B29C 39/26 |
| 2017/0129167 A1* | 5/2017 | Castanon | ................ | B33Y 30/00 |
| 2017/0355132 A1* | 12/2017 | Moore | .................... | B29C 35/02 |
| 2020/0171746 A1* | 6/2020 | Schmidt | ................ | B29C 64/124 |

FOREIGN PATENT DOCUMENTS

| | | |
|---|---|---|
| WO | 2012021940 | 2/2012 |
| WO | 2016123506 | 8/2016 |
| WO | 2017085648 | 5/2017 |

* cited by examiner

PRECISION OPTICAL ASSEMBLY FOR THREE DIMENSIONAL PRINTING

CROSS-REFERENCE TO RELATED APPLICATIONS

This non-provisional patent application claims priority to U.S. Provisional Application Ser. No. 62/781,971, Entitled "PRECISION OPTICAL ASSEMBLY FOR THREE DIMENSIONAL PRINTING" by David Sabo, filed on Dec. 19, 2018, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present invention improves the fabrication accuracy of a three dimensional (3D) article of manufacture by reducing an optical path length variation.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin. Each selectively cured layer is formed at a "build plane" within the resin.

One class of stereolithography systems utilizes resin vessel having a lower side with a transparent sheet. A projection-type light engine projects light up through the transparent sheet. The build plane is within the resin and very close to the transparent sheet. One challenge with such a system includes a mechanical variability in the optical path from the projector to the build plane. Another challenge is a durability of the components including the transparent sheet. Yet another challenge is a manufacturing cost to build precision components.

SUMMARY

In a first aspect of the disclosure, a three-dimensional printer is configured for manufacturing a three-dimensional article. The three-dimensional printer includes a light engine, a support plate, and a resin vessel. The light engine is configured to selectively harden photocurable resin at a build plane in the resin vessel. The support plate is formed from cast metal and is in a fixed vertical relation to the light engine. The support plate includes an upper side and an opposed lower side. The upper side includes an upstanding ridge that has an upper datum surface that has been machined to a controlled height above the light engine. The support plate also includes a ring disposed upon the upper datum surface. The ring defines a crest of the upstanding ridge. The resin vessel includes a transparent sheet that defines a lower bound for resin contained in the resin vessel. The transparent sheet impinges upon the crest to define a vertical location of the build plane in relation to the light engine. The ring can be separately formed before being attached to the upper datum surface. Alternatively, the ring can be formed onto the upper datum surface as a post-process.

The support plate is formed by casting it from liquid metal. Casting includes pouring the liquid metal into a mold and then cooling the liquid metal to a solid state. After solidification, a crest or apex of the upstanding ridge is machined away to provide the datum surface.

One challenge with cast parts is accuracy and porosity. Machining the upper datum surface improves dimensional accuracy. However, pores in the metal may result in sharp edges that may damage the transparent sheet. The machining followed by the separately formed ring solves this issue. The separately attached ring also provides more design flexibility than when the crest of the upstanding ridge is formed by machining or casting the support plate. The crest geometry can be modified by interchanging rings defining different crest geometries or materials with different degrees of resiliency.

In one implementation the lower side of the support plate has a machined lower datum surface. The machined lower datum surface can include several separately machined locations or one large continuous machined surface. The three-dimensional printer further includes an adaptive support apparatus coupled to the light engine and a plurality of vertical struts coupled between the adaptive support apparatus and the machined lower datum surface of the support plate. The light engine includes a projection lens module. The adaptive support apparatus vertically references to the projection lens module. This design assures a very accurate dimensional control between the machined surfaces of the support plate and the projection lens module.

In another implementation the upper side of the support plate defines an inwardly facing vertical wall that engages an outer surface of the resin vessel to align the transparent sheet to the upstanding ridge.

In yet another implementation the upstanding ridge defines a rectangular shape with four rounded corners. The rounded corners individually define a recess corner relief to reduce a stress concentration at the corners.

In a further implementation, the ring is formed from one or more of an injection molded metal or polymer. The injection molded polymer can be one or more of polypropylene, polytetrafluoroethylene (PTFE), Polyoxymethylene (POM), polyamide (PA), nitrile rubber, fluoropolymer elastomer, silicone rubber, ethylene propylene rubber (EPR), neoprene, polyurethane, and other natural and synthetic rubber materials.

In a yet further implementation, the ring is formed by a thermoforming process. In thermoforming, a plastic sheet is heated to a pliable forming temperature and formed to a specific shape. The thermoforming can be performed separately in a mold or directly onto the upper datum surface of the upstanding ridge. The plastic sheet can be formed from fluorinated ethylene propylene (FEP) or another suitable polymer.

In another implementation, the three-dimensional printer can include a main vertical support supporting a motorized carriage and a controller. The support plate is attached to the main vertical support. The motorized carriage supports and vertically positions a support tray over the resin vessel. The controller is configured to operate the motorized carriage and the light engine to manufacture the three-dimensional article.

In a second aspect of the disclosure, a method for assembling a three-dimensional printer includes casting a support plate having a lower surface and an opposed upper surface with an upstanding ridge, fabricating a ring, machining the lower surface to define a lower datum, machining the upstanding ridge to define an upper datum surface, placing the fabricated ring upon the upper datum surface to define a crest of the upstanding ridge, and assembling the support plate to a light engine. The lower datum is vertically referenced to the light engine to control the scale of features defined at a build plane.

In one implementation referencing the lower datum to the light engine includes assembling an adaptive support apparatus to the light engine and then coupling and referencing a plurality of vertical struts between the lower datum of the support plate and an upper surface of the adaptive support apparatus. The light engine includes a projection lens module. Assembling the adaptive support apparatus to the light engine can include referencing a lower surface of the adaptive support apparatus to the projection lens module and coupling the adaptive support apparatus to the light engine.

In another implementation fabricating the ring can include injection molding the ring from a polymer or metal. Such a polymer can include one or more of polypropylene, polytetrafluoroethylene (PTFE), Polyoxymethylene (POM), polyamide (PA), nitrile rubber, fluoropolymer elastomer, silicone rubber, ethylene propylene rubber (EPR), neoprene, polyurethane, and other natural and synthetic rubber materials.

In yet another implementation fabricating the ring can include thermoforming from a polymer material such as FEP. The ring can be separately fabricated in a mold or directly thermoformed onto the upper datum surface of the upstanding ridge.

In a further implementation assembling can include attaching the support plate to a main vertical support and coupling a motorized carriage to the main vertical support.

In a second aspect of the disclosure, a method for manufacturing a three-dimensional printer includes: (1) casting a support plate having a lower surface and an opposed upper surface with an upstanding ridge, (2) fabricating a ring, (3) machining the lower surface to define a lower datum, (4) machining the raised ridge to define an upper datum surface, (5) placing the fabricated ring upon the upper datum surface to define a crest of the upstanding ridge, and (6) assembling the support plate to a light engine. The lower datum is vertically referenced to the light engine to control the scale of features defined at a build plane.

In one implementation assembling the support plate to the light engine includes (6A) assembling an adaptive support apparatus to the light engine and (6B) coupling a plurality of vertical struts between the lower datum of the support plate and an upper surface of the adaptive support apparatus. The light engine includes a projection lens module. Assembling the adaptive support apparatus to the light engine includes referencing a lower surface of the adaptive support apparatus to the projection lens module.

In another implementation fabricating the ring includes injection molding the ring. The ring can be injection molded from a polymer which includes one or more of polypropylene, polytetrafluoroethylene (PTFE), Polyoxymethylene (POM), polyamide (PA), nitrile rubber, fluoropolymer elastomer, silicone rubber, ethylene propylene rubber (EPR), neoprene, polyurethane, and other natural and synthetic rubber materials. The ring can be injection molded from an injection moldable metal.

DETAILED DESCRIPTION OF THE PREFERRED EMBODIMENTS

Figure 1:
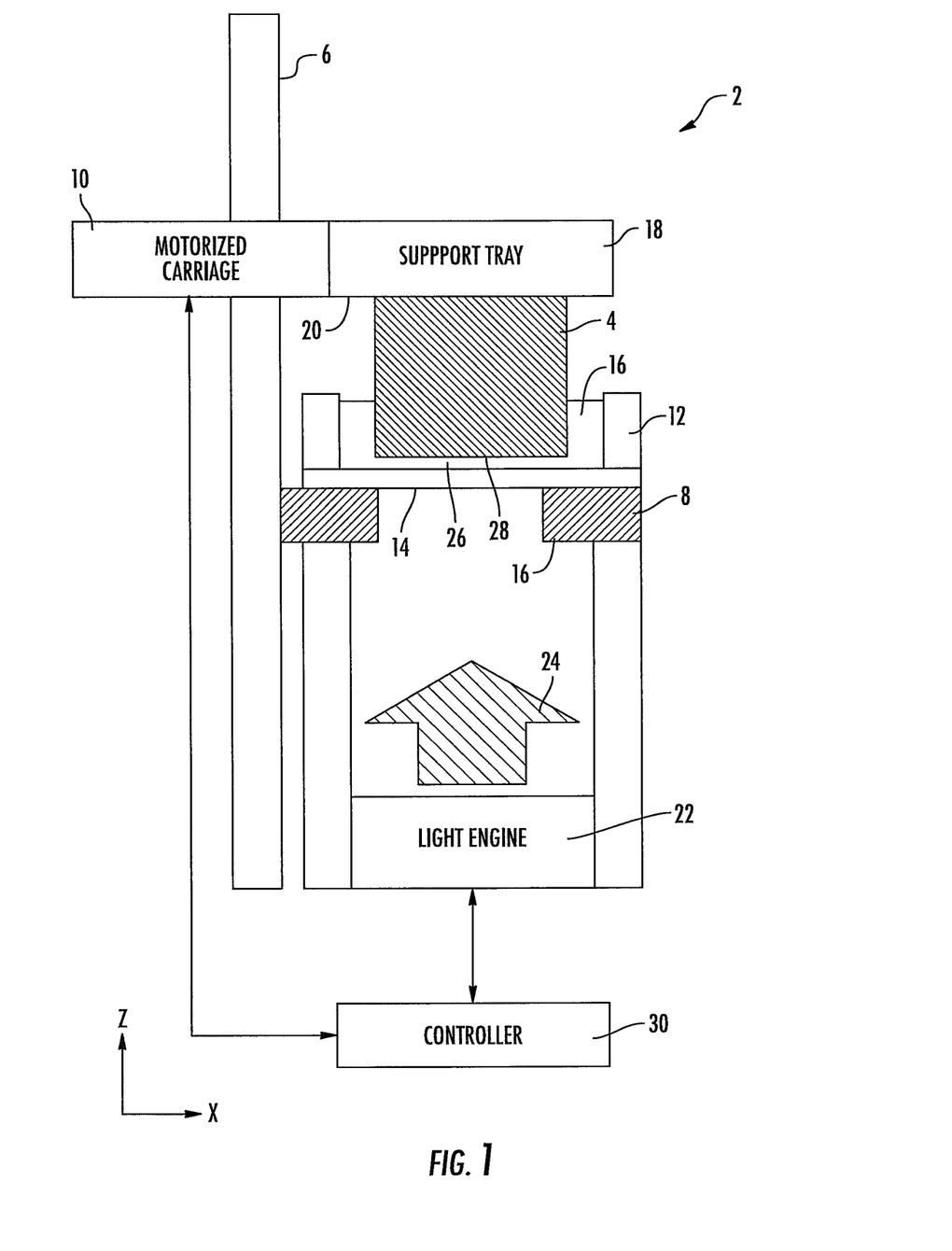
FIG. 1 is a schematic block diagram of a three-dimensional printing system with an improved optical path.

FIG. 1 is a schematic block diagram of a three-dimensional printing system 2 for manufacturing a three-dimensional article 4. System 2 includes a main vertical support 6 which supports various components including a support plate 8 and a motorized carriage 10. The support plate 8 is fixedly attached to the support 6 and in turn supports a resin vessel 12. Resin vessel 12 includes a transparent sheet 14 that provides a lower bound for photocurable resin 16 contained in the resin vessel 12.

In describing system 2, mutually orthogonal axes X, Y, and Z will be used. The X and Y axes are also referred to as lateral or horizontal axes. The Z-axis is also referred to as a vertical axis and is generally aligned with a gravitational reference. "Generally aligned" means that the Z-axis is generally vertical by design but may not be exactly aligned due to placement or mechanical tolerance variations.

The motorized carriage 10 supports and vertically positions a support tray 18. The three-dimensional article 4 is formed upon a lower surface 20 of the support tray 18.

A light engine 22 is supported at a specified distance from the transparent sheet 14. The light engine 22 is configured to project pixelated light 24 to a build plane 26 which is proximate to a lower face 28 of the three-dimensional article 4. The build plane 26 defines a lateral extent of the light engine 22 within the resin vessel 12. A vertical height of the build plane 26 is a fraction of a millimeter above the transparent sheet 14 and therefore has a vertical position that is primarily determined by the vertical position of the transparent sheet 14. Rays of the pixelated light 24 diverge as they are projected vertically to the build plane 26. Thus, the vertical distance from the light engine 22 to the build plane 26 determine a lateral scale factor for the pixels. Thus, the vertical distance is controlled precisely by the design of system 2. The vertical distance is controlled by mechanically coupling and referencing the light engine 22 to the support plate 8.

A controller 30 is electrically or wirelessly coupled to the motorized carriage 10 and the light engine 22. Controller 30 includes a processor coupled to an information storage device. The information storage device includes a nonvolatile or non-transient storage device storing software instructions. The software instructions, when executed by the processor, operate the motorized carriage 10 and the light engine 22 to fabricate the three-dimensional article 4 in a layer-by-layer manner.

To fabricate the three-dimensional article 4, the controller 30 is configured to: (1) operate the motorized carriage 10 to position the lower surface 20 of the support tray proximate to the build plane 26; (2) operate the light engine to selectively harden one or more layers of the photocurable resin 16 onto the lower surface 20 and defining a lower face 28; (3) operate the motorized carriage 10 to reposition the lower face 28 proximate to the build plane 26; (4) operate the light engine 22 to selectively harden another layer of photocurable resin onto the lower face 28; (5) repeat steps (3) and (4) to finish fabricating the three-dimensional article 4.

Figure 2:
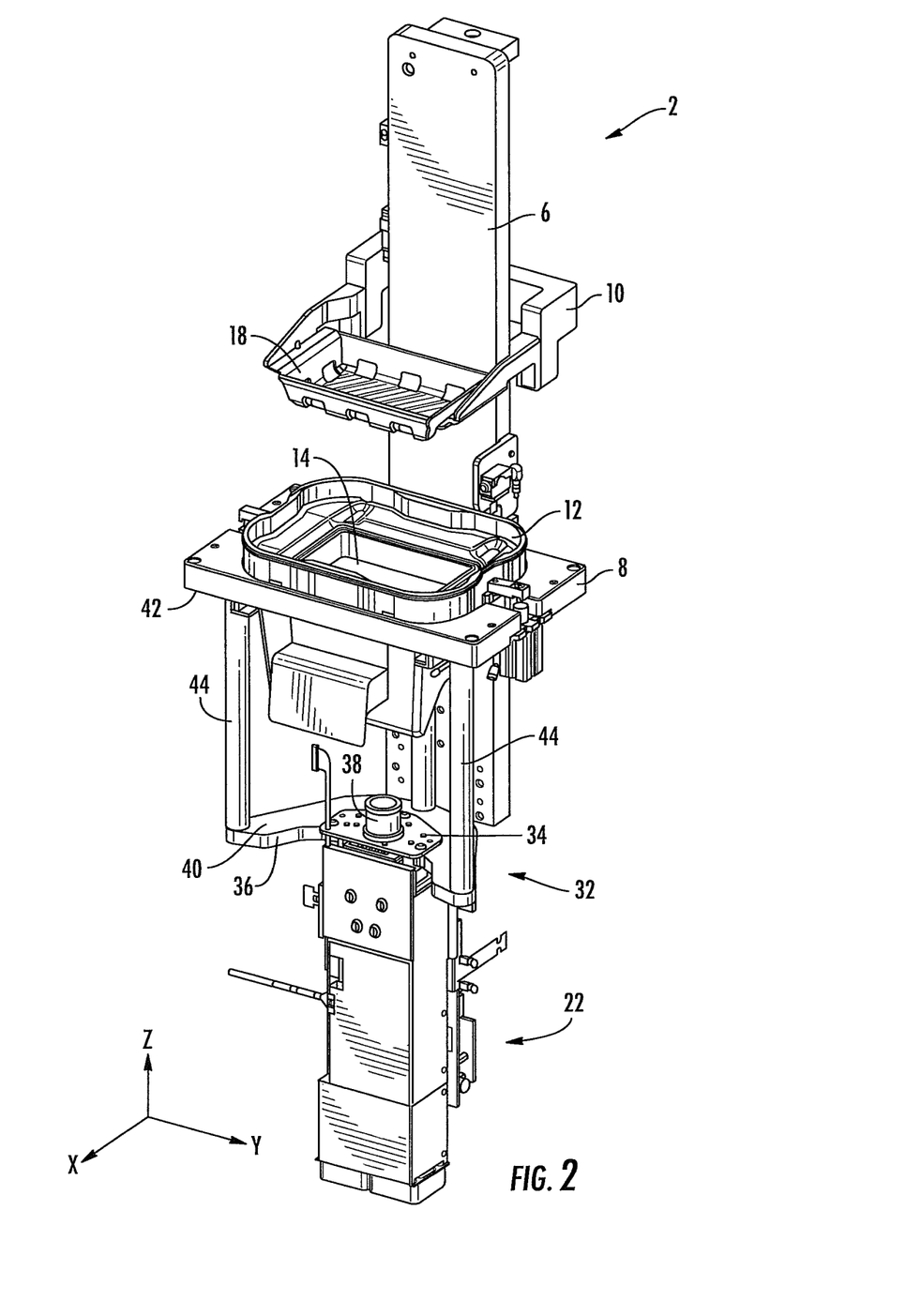
FIG. 2 is an isometric drawing of an embodiment of a three-dimensional printing system having an improved optical path.

FIG. 2 is an isometric drawing of an embodiment of the system 2. Various portions of system 2 are "coupled" and "referenced" to maintain an accurate vertical positioning of the light engine 22 with respect to the support plate 8. "Coupled" means that screws or other attachment means are used to connect two objects. On the other hand, "referenced" means that a datum surface of one object is pressed directly or indirectly against a datum surface of another object. A datum surface is typically a dimensionally accurate machined metal surface and is typically planar. Therefore, "referencing" two objects means pressing two precision surfaces of the objects together either directly or with a precision article such as a precision ring between them.

An adaptive support apparatus 32 is coupled and referenced to the light engine 22. The adaptive support apparatus 32 includes an interface plate 34 and a lateral adapter 36. The light engine 22 includes a projection lens module 38. The projection lens module 38 is cylindrical metal housing that contains projection optics for projecting the light from light engine 22 to the build plane 26. A lower datum surface of the interface plate 34 is referenced to a flange of the projection lens module 38. In some embodiments, a spacer ring may be compressively placed between the interface plate 34 and the projection lens module 38. Thus, the interface plate 34 is referenced to the projection lens module 38. The interface plate 38 is also coupled to light engine 22. The lower datum surface of the interface plate 34 is referenced and coupled to an upper datum surface 40 of the lateral adapter 36.

The support plate 8 includes a machined lower datum surface 42. A plurality of vertical struts 44 extend between the upper datum surface 40 of the lateral adapter 36 and the lower datum surface 42 of the support plate 8. The struts 44 are referenced to the datum surfaces 40 and 42. The struts are coupled to the support plate 8 and the lateral adapter 36.

Figure 3A:
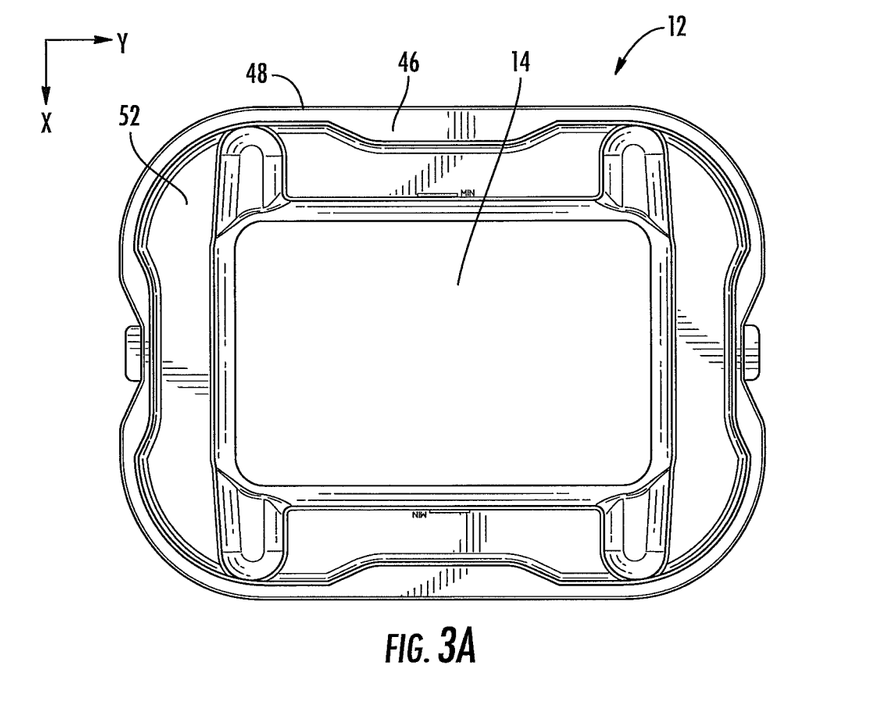
FIG. 3A is a top view of an embodiment of a resin vessel.

FIG. 3A is a top view of the resin vessel 12. Resin vessel 12 includes an outer frame 46 and transparent sheet 14. The outer frame 46 defines a vertical outer surface 48.

Figure 3B:
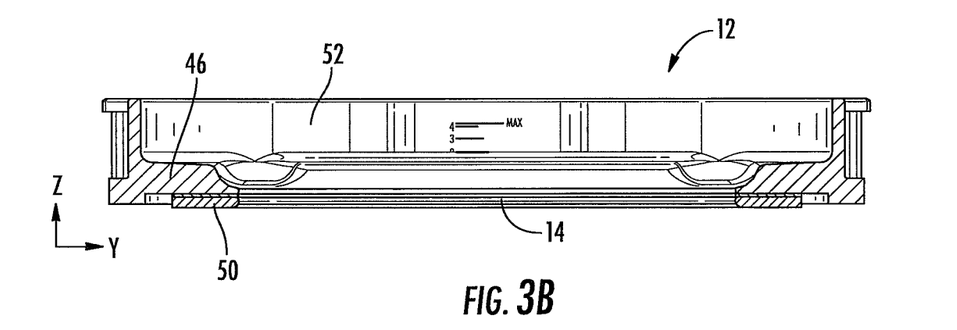
FIG. 3B is a cutaway side view of an embodiment of a resin vessel.

FIG. 3B is a side cutaway view of resin vessel 12. The transparent sheet 14 is held in place by a retainer 50. The outer frame 46 and the transparent sheet 14 define an inner cavity 52 for containing the photocurable resin 16.

Figure 4:
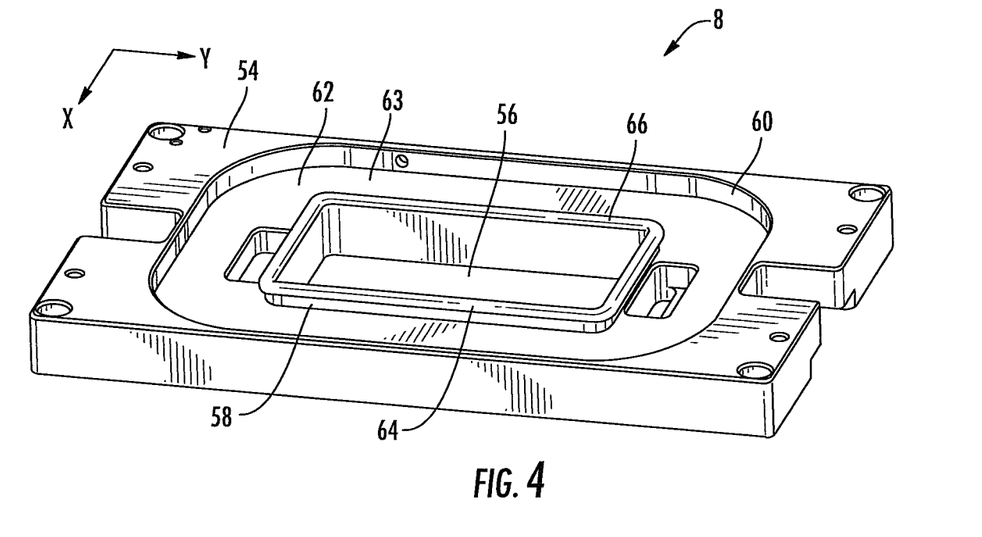
FIG. 4 is an isometric drawing of an embodiment of a support plate.

FIG. 4 is an isometric view of the support plate 8. Support plate 8 has an upper surface 54 defining a central opening 56, an upstanding ridge 58 surrounding the central opening 56, and an inwardly facing wall 60 facing the upstanding ridge 58 and defining a recess 62 and recessed surface 63. The upstanding ridge 58 includes a "separately formed" ring 64 defining a crest 66 of the upstanding ridge. By "separately formed", the ring 64 is fabricated by a separate process such as molding or injection molding or machining before being attached to the upstanding ridge 58. Molding or injection molding requires the use of a rigid mold having the shape of the ring and then injecting a molten polymer into the rigid mold. Alternatively, the ring 64 may be formed onto the upstanding ridge 58 by a post-process such as insert molding. With an insert molding post-process, the support plate 8 can be used as an insert or portion of an injection molding process.

When the resin vessel 12 is loaded onto the support plate 8, the outer frame 46 is received into the recess 62. The inwardly facing wall 60 engages the vertical outer surface 48 to align the transparent sheet 14 to the upstanding ridge 58.

Figure 5:
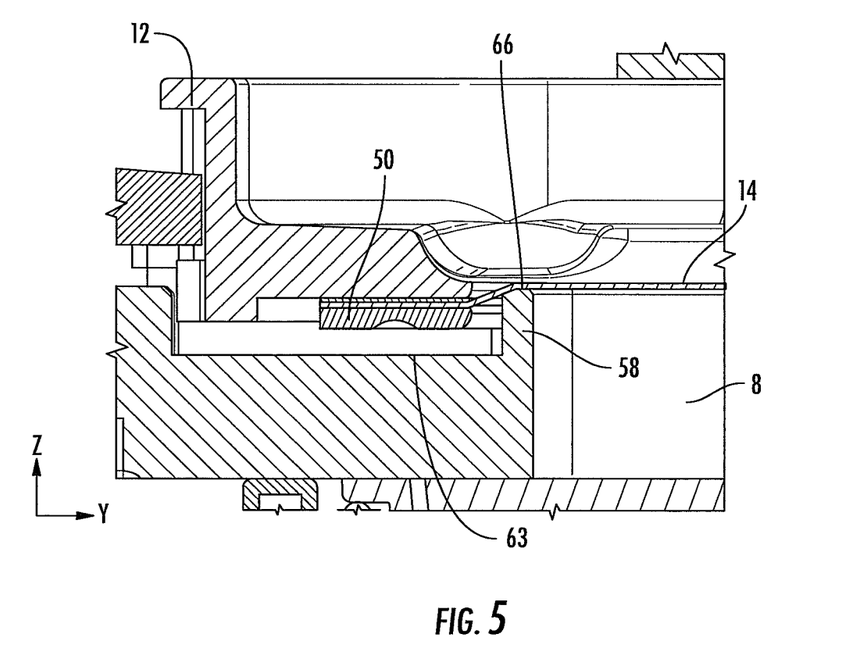
FIG. 5 is a cutaway view of a portion of an embodiment of a resin vessel loaded onto a support plate.

FIG. 5 is a cutaway view of a portion of the resin vessel 12 that is loaded and latched onto the support plate 8. The crest 66 of the upstanding ridge 58 impinges upon the transparent sheet 14. The crest 66 is vertically within a fraction of a millimeter from the build plane 26. Thus, the vertical height of the crest 66 is therefore an important determinant of a scale factor of pixels in the build plane 26.

Figure 6:
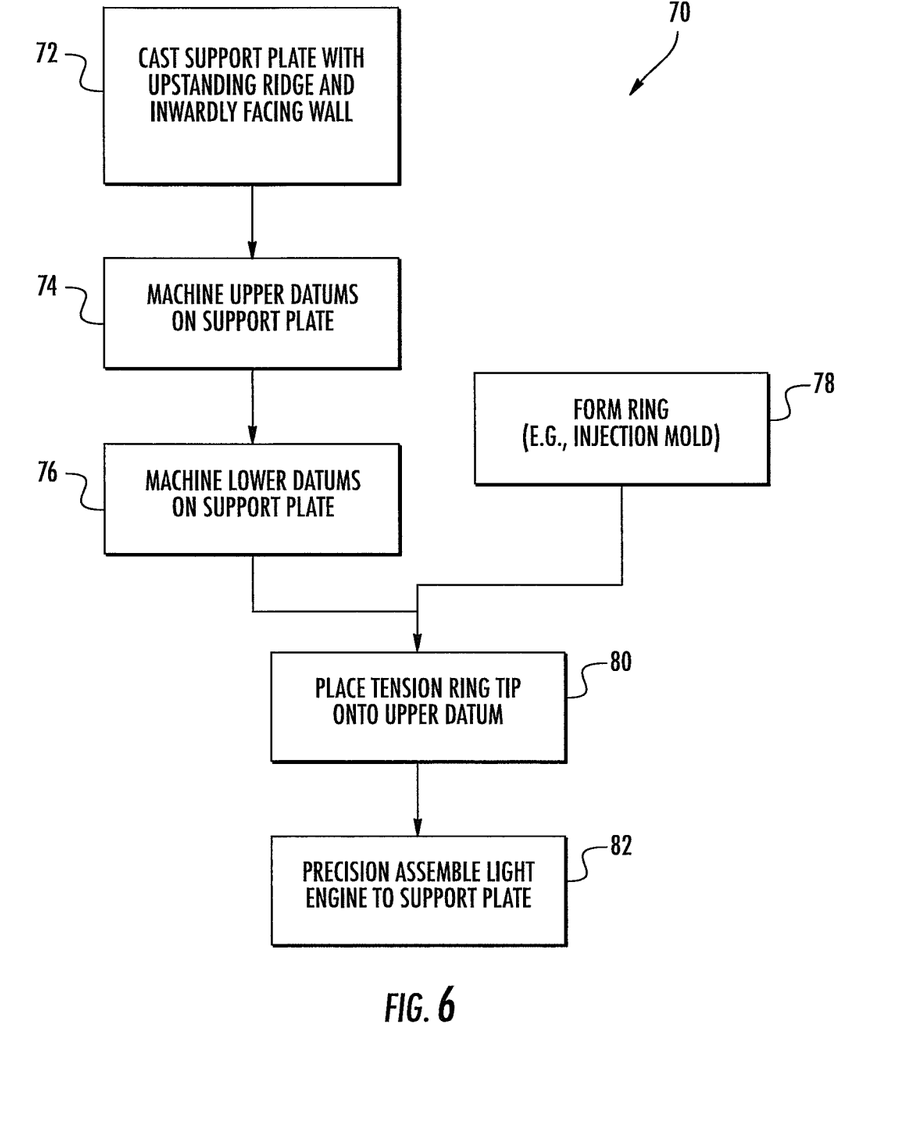
FIG. 6 is a flowchart depicting an embodiment of a method of manufacturing an optical path portion of a three-dimensional printing system.

FIG. 6 is a flowchart depicting a method 70 of manufacturing a portion of the three-dimensional printing system 2. According to 72, a support plate 8 is cast or molded from metal. In some embodiments, casting includes pouring liquid metal into a form or mold and then allowing the liquid metal to cool and solidify. The cast support plate 8 includes an upstanding ridge 58 that extends farther than desired above a lower surface of the support plate 8.

Figure 7:
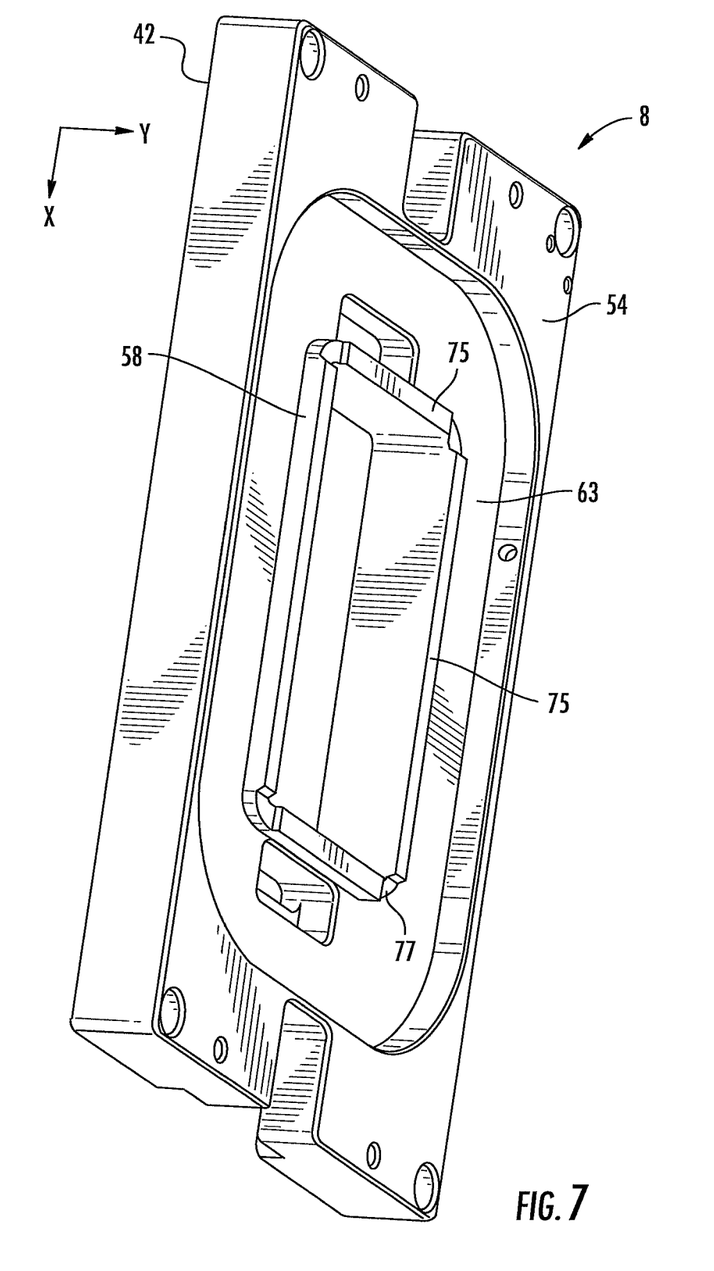
FIG. 7 is an isometric drawing of a cast metal support plate after machining an upper datum surface at the top of an upstanding ridge.

According to 74, upper datums 75 are machined into the upper surface 54 of support plate 8. This includes machining the apex or crest of the upstanding ridge 58 to provide a datum surface 75 atop the upstanding ridge 58. FIG. 7 depicts the support plate with the machined datum surface 75. Also shown is a recessed corner relief 77. When the separately formed ring 64 is formed from a resilient material, the rounded corners of the ring 64 can result in a stress concentration. The recessed corner relief 77 can reduce the stress concentration. As part of 74, other datums can be machined into the upper surface 54 as well.

According to 76, lower datums are machined into the lower datum surface 42 of the support plate 8. The height difference between the upper 75 and lower 42 datum surfaces is precisely controlled. While the flowchart of FIG. 6 illustrates machining the upper datums 74 before the machining lower datums 76, it is to be understood that 76 can be performed before 74 or they can be performed simultaneously.

Asynchronously with the casting and datum machining, the ring 64 is formed according to 78. In some embodiments, ring 64 is formed through an injection molding process. The ring 64 can be formed from a polymer that can include one or more materials including one or more of polypropylene, polytetrafluoroethylene (PTFE), Polyoxymethylene (POM), polyamide (PA), nitrile rubber, fluoropolymer elastomer, silicone rubber, ethylene propylene rubber (EPR), neoprene, polyurethane, and other natural and synthetic rubber materials to name some examples. In other embodiments, ring 64 can be formed form an injection molded metal. In yet other embodiments, ring 64 can be formed by precision machining a metal. When ring 64 is formed from a metal, it can be coated with a low friction material or a polymer.

According to 80, the ring 64 is placed upon and attached to the upper datum surface 75. According to 82, the light engine 22 assembled to the support plate 8.

As part of assembling the light engine 22 to the support plate 8, the adaptive support apparatus 32 is referenced and coupled to the light engine 22. This can include (1) referencing the interface plate 34 to the projection lens module 38, (2) coupling the interface plate 34 to the light engine 22, (3) coupling and referencing the upper surface 40 of the lateral adapter 36 to the interface plate 34, and coupling and referencing a plurality of struts 44 to datum surfaces 40 and 42 from the lateral adapter 36 to the support plate 8.

The method 70 provides a precise control of a vertical distance between optics within the projection lens module 38 to the crest 66 of the upstanding ridge 58. The crest 66 is vertically within a millimeter of the build plane 26.

Figure 8A:
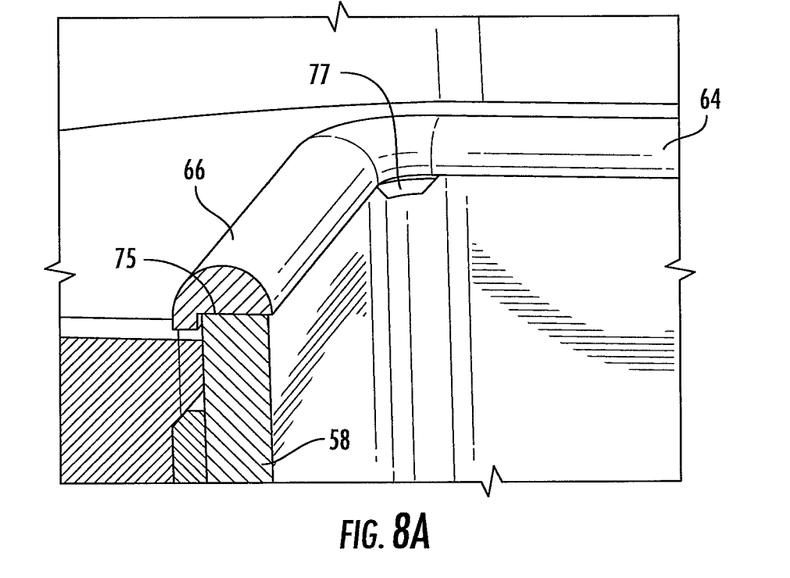
FIG. 8A is an isometric view of a portion of a first embodiment of an injection molded ring placed upon a machined upper datum surface of an upstanding ridge.

FIG. 8A is an isometric view of a portion of a first embodiment of an injection molded ring 64 placed upon the machined upper datum surface 75 of the upstanding ridge 58. The ring 64 can be made of a resilient material such as a polymer. The crest 66 of the illustrated ring 64 has a circular geometry in cross-section. Under rounded corners of ring 64 are the recessed corner reliefs 77.

Figure 8B:
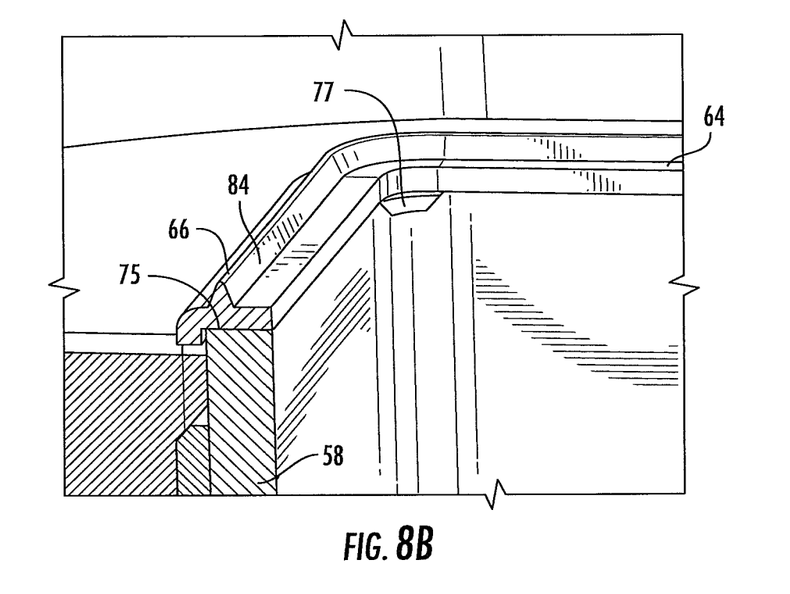
FIG. 8B is an isometric view of a portion of a second embodiment of an injection molded ring placed upon a machined upper datum surface of an upstanding ridge.

FIG. 8B is an isometric view of a portion of a second embodiment of an injection molded ring 64 placed upon the machined upper datum surface 75 of the upstanding ridge 58. The ring 64 can be made of a resilient material such as a polymer. The crest 66 is at the top of a tapered portion 84 of the ring 64. Other embodiments of ring 64 can have crests 66 that define other geometries.

The specific embodiments and applications thereof described above are for illustrative purposes only and do not preclude modifications and variations encompassed by the scope of the following claims.

What is claimed:

1. A three-dimensional printer for manufacturing a three-dimensional article, comprising:
 a light engine for selectively hardening photocurable resin at a build plane;
 a cast metal support plate in fixed relation to the light engine and defining an upstanding ridge having a machined upper datum disposed at a controlled height above the light engine;
 a polymer ring disposed upon the machined upper datum surface of the cast metal support plate to define a crest of the polymer ring above the upstanding ridge;
 a resin vessel including a transparent sheet that defines a lower bound for the photocurable resin, the crest of the polymer ring engages the transparent sheet and therefore defines a distance between the light engine and the build plane, the polymer ring is configured to prevent sharp edges of the machined upper datum surface from damaging the transparent sheet.

2. The three-dimensional printer of claim 1 wherein the support plate includes a machined lower datum surface and further comprising:
 an adaptive support apparatus coupled to the light engine; and
 a plurality of vertical struts coupled between the adaptive support apparatus and a machined lower datum surface of the support plate.

3. The three-dimensional printer of claim 2 wherein the light engine includes a projection lens module, the adaptive support apparatus vertically references to the projection lens module.

4. The three-dimensional printer of claim 1 wherein the support plate includes an upper surface defining an inwardly facing vertical wall that engages an outer surface of the resin vessel to align the transparent sheet to the upstanding ridge.

5. The three-dimensional printer of claim 1 wherein the upstanding ridge defines a rectangular shape with four rounded corners, the rounded corners individually defined a recess corner.

6. The three-dimensional printer of claim 1 wherein the polymer ring includes one or more of polypropylene, polytetrafluoroethylene (PTFE), Polyoxymethylene (POM), polyamide (PA), nitrile rubber, fluoropolymer elastomer, silicone rubber, ethylene propylene rubber (EPR), neoprene, polyurethane, and other natural and synthetic rubber materials.

7. The three-dimensional printer of claim 1 further comprising a main vertical support, the support plate is attached to the main vertical support.

8. The three-dimensional printer of claim 7 further comprising a motorized carriage, the motorized carriage coupled to a support tray, the support tray supporting the three-dimensional article on a lower surface.

9. The three-dimensional printer of claim 8 further comprising a controller configured to operate the motorized carriage and the light engine to manufacture the three-dimensional article.

10. The three-dimensional printer of claim 1 wherein the upper datum surface includes a flat horizontal surface, the polymer ring is disposed upon the flat horizontal surface.

11. The three-dimensional printer of claim 10 wherein the defined crest of the polymer ring has a circular cross-section above the flat horizontal surface.

12. The three-dimensional printer of claim 10 wherein polymer ring includes a tapered crest above the flat horizontal surface.

13. The three-dimensional printer of claim 10 wherein the upper datum surface defines a rectangular shape with four rounded corners, the rounded corners individually define a recessed corner relief.

14. A three-dimensional printer for manufacturing a three-dimensional article, comprising:
 a light engine configured to selectively cure photocurable resin at a build plane;
 a support plate consisting of a cast metal material and defining a central opening and an upper datum surface that generally surrounds the central opening and a machined lower datum surface;
 a polymer ring disposed upon a previously machined upper datum surface of the support plate to define a crest of the polymer rinq above the datum surface; and
 a resin vessel including a transparent sheet that defines a lower bound for the photocurable resin, the crest of the polymer ring engages the transparent sheet and therefore defines a distance between the light engine and the build plane, the polymer ring is configured to prevent sharp edges of the machined upper datum surface from damaging the transparent sheet; and
 an adaptive support apparatus coupled to the light engine; and
 a plurality of vertical struts coupled between the adaptive support apparatus and the machined lower datum surface of the support plate.

15. The three-dimensional printer of claim 14 wherein the upper datum surface defines a rectangular shape with four rounded corners, the rounded corners individually defined a recess corner relief.

16. The three-dimensional printer of claim 14 wherein the polymer ring includes one or more of polypropylene, polytetrafluoroethylene (PTFE), Polyoxymethylene (POM), polyamide (PA), nitrile rubber, fluoropolymer elastomer, silicone rubber, ethylene propylene rubber (EPR), neoprene, polyurethane, and other natural and synthetic rubber materials.

17. The three-dimensional printer of claim 14 wherein the upper datum surface includes a flat horizontal surface, the polymer ring is disposed upon the flat horizontal surface.

18. The three-dimensional printer of claim 17 wherein the defined crest of the polymer ring has a circular cross-section above the flat horizontal surface.

19. The three-dimensional printer of claim 17 wherein polymer ring includes a tapered crest above the flat horizontal surface.

20. The three-dimensional printer of claim 17 wherein the upper datum surface defines a rectangular shape with four rounded corners, the rounded corners individually define a recessed corner relief.

* * * * *